Oct. 7, 1969   J. D. SHACKMAN   3,470,797
DISPLAY DEVICE
Filed Aug. 25, 1966   3 Sheets-Sheet 1
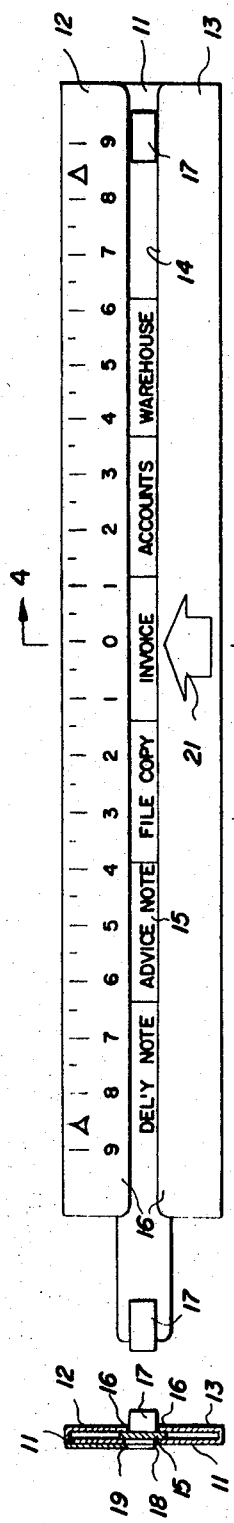
FIG. 1
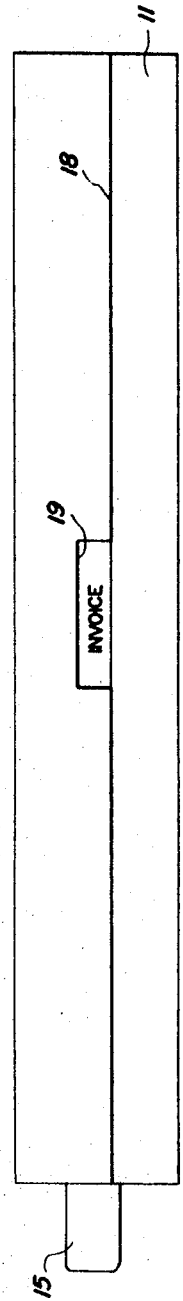
FIG. 2
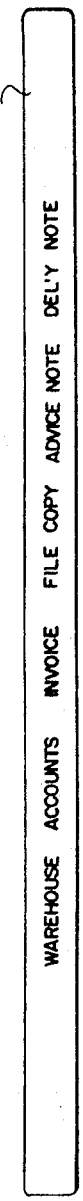
FIG. 3
FIG. 4
INVENTOR.
JACOB D. SHACKMAN
BY
ATTORNEYS

INVENTOR.
JACOB D. SHACKMAN

United States Patent Office 3,470,797
Patented Oct. 7, 1969

3,470,797
DISPLAY DEVICE
Jacob D. Shackman, London, England, assignor to Xerox Corporation, Rochester, N.Y., a corporation of New York
Filed Aug. 25, 1966, Ser. No. 575,155
Claims priority, application Great Britain, Aug. 27, 1965, 36,994/65
Int. Cl. G03b *17/24*
U.S. Cl. 95—1.1                    3 Claims

ABSTRACT OF THE DISCLOSURE

An opaque display device adapted to be removably positioned on the platen of a copying machine to present variable information as a composite image with a document to be copied. The display device may be in the form of a rotatable disc member or as a linear slide member arranged in a frame which is provided with a stop means for registering a selected portion of the document to be copied with the variable information.

---

This invention relates to exposure devices for use in conjunction with document copying machines, in which documents to be copied are placed on a transparent platen and are copied by reflection projection of an image of the document onto a light sensitive surface.

The exposure device of the invention is particularly useful in conjunction with a xerographic copying machine of the type disclosed in U.S. Patent No. 3,062,109 issued to Mayo et al. However, it finds general application in any copying system where an image of the document is formed by reflection projection while the image is supported on a transparent platen.

When making a number of copies of a document it is sometimes desired that each copy should bear, in addition to the graphic information contained on the original document, additional information which differs from copy to copy. For example, it may be desired that each copy of the original document should bear the name of a different addressee to whom the copies are to be sent. Commonly, this is achieved by simply typing on each copy the additional information required. Alternatively, it is possible to locate on the platen, at the same time as the original document to be copied, an additional document which adds to the projected image the extra information required for the particular copy being made. Such techniques are however time consuming.

The present invention provides an exposure device for selectively exposing a desired element of graphic information in a copying system using reflection projection, comprising a movable member bearing a plurality of elements of graphic information and a shielding member for covering at least part of the surface of said movable member bearing said information elements whereby a selected element of information can be exposed for copying during a copying operation while other informational elements are concealed.

Preferably the shielding member is formed with an aperture through which a selected information element can be exposed for copying. Movement of the movable member relative to the shielding member then serves to bring the desired information element into register with the aperture for exposure during the copying process.

The device may include indicating means for indicating the particular item of information selected for exposure and preferably all of the alternative information elements are visible at or upon the indicating means to facilitate selection of a particular information element. Conveniently the indicating means may be formed on the reverse side of the movable member to the side thereof on which the information elements are positioned.

The exposure device of the invention may also include means for positioning the device on the platen of a copying machine and preferably also means for positioning an original document to be copied simultaneously with the copying of the particular information element exposed.

In order that the exposure device of the invention may be used to effect copying of different sets of alternative information elements it is desirable that the movable member should be removably mounted on the exposure device.

It is therefore an object of this invention to improve reproduction apparatus for reproducing composite copies from a form original and a variable input.

Another object of this invention is to include on every copy the variable information such as the name of the person and/or address of the place where the copy is to be sent.

A further object of this invention is to incorporate in a copying machine a device for adding variable information to a form original.

For a better understanding of the invention as well as further objects and features thereof, references had to the following detailed description of the invention to be read in connection with the accompanying drawings, wherein:

FIG. 1 is a plan view of an exposure device for copying machines;

FIG. 2 is a bottom view of the device shown in FIG. 1;

FIG. 3 is a bottom view of the slide of the device shown in FIG. 1;

FIG. 4 is a sectional view of the device taken along line 4—4 of FIG. 1;

Figure 5:
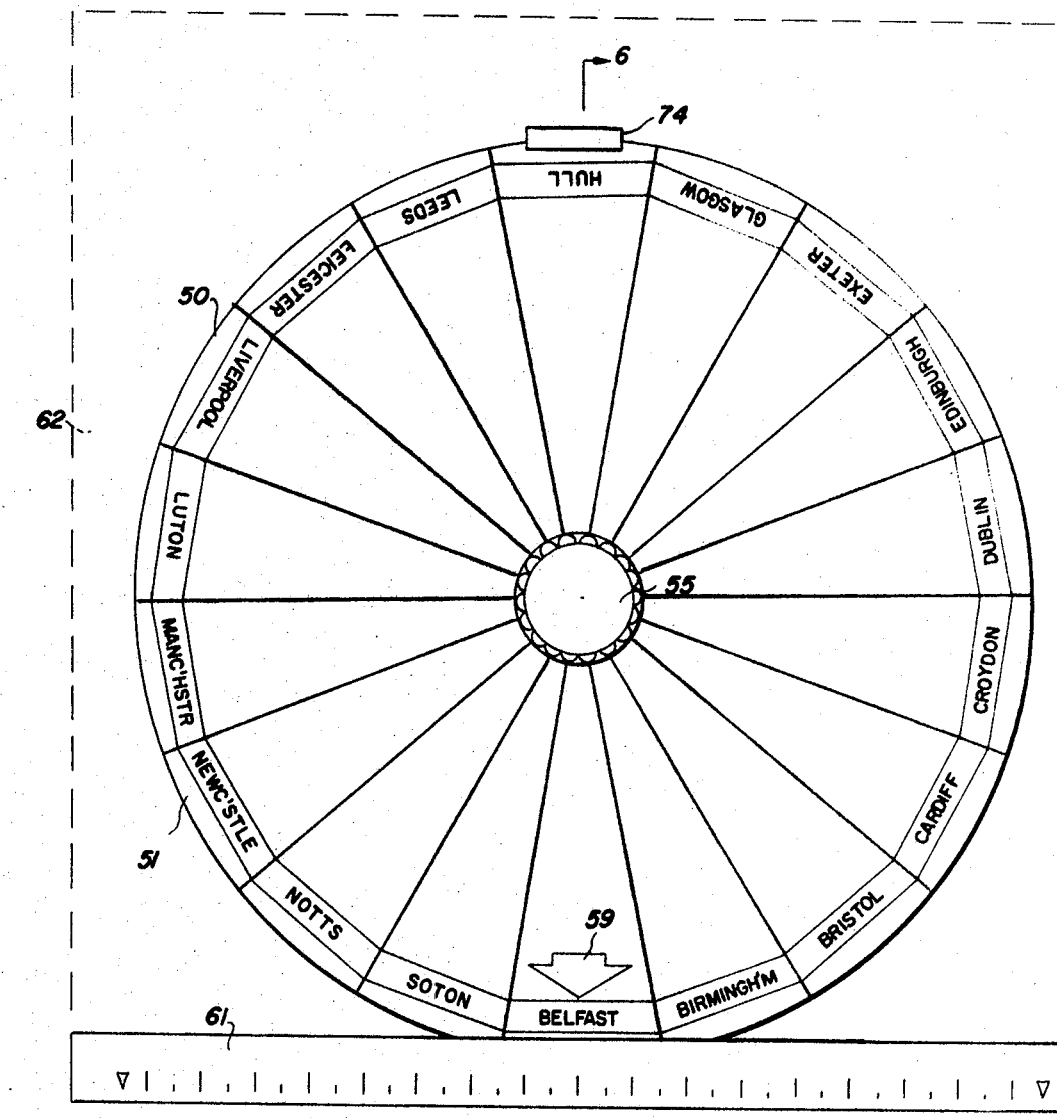
FIG. 5 is a plan view of an alternative embodiment of the exposure device shown in FIG. 2.

Referring now to FIGURES 1 to 4 of the drawings, an exposure device comprises a shielding base member 11 on which are mounted two side pieces 12, 13 defining a channel 14 extending along the length of the device. A slide 15 fits closely in the channel 14 between the side pieces 12, 13 and may be slid along the length of the device. Inwardly directed lips 16 extend over the edges of the channel 14 to retain the slide 15 within the channel, and a knob 17 on each end of the slide 15 extends upwardly through the slot 14 defined by the lips 16. A paper stop 18 is mounted on the underside of the shielding member to locate the edge of the document to be copied with respect to the device. An additional stop may also be provided for locating the bottom or top edge of the document. An aperture 19 is formed through the shielding member 11 and through the paper stop.

The underside of the slide 15 is marked with a number of alternative headings for copying in conjunction with documents on a copying machine so that as the slide is slid along the channel 14, one heading is visible through the aperture 19.

The portion of the slide 15 visible through the slot 14 is divided into a number of equal areas on which are marked replicas of the alternative headings in the same relative positions as the headings on the underside of the slide. An arrow 21 on the side piece 12 indicates the heading whose replica is visible through the aperture 19. The other side piece 13 is marked with a scale for centering the document to be copied in conjunction with the heading relative to the device.

In operation, the shielding member is placed against one edge of the copying frame of a copying machine. The member 11 is placed on the top edge of a document to be copied which is face-downwards and located by the paper stop 18. The slide 15 is moved along the channel 14 by means of the knobs 17 until the selected heading is located opposite the arrow 21. The replica of the selected heading will now also be visible through the aperture 19 in the base of the device.

When the copying machine is operated, the heading appearing in the aperture 19 will be copied along with the document to appear as a heading to the copy of the document. If the machine is adjusted to make multiple copies of the document alternative headings may be selected by the device between successive copyings of the document, so that different headings appear on the copies of the document being made.

Figure 7:
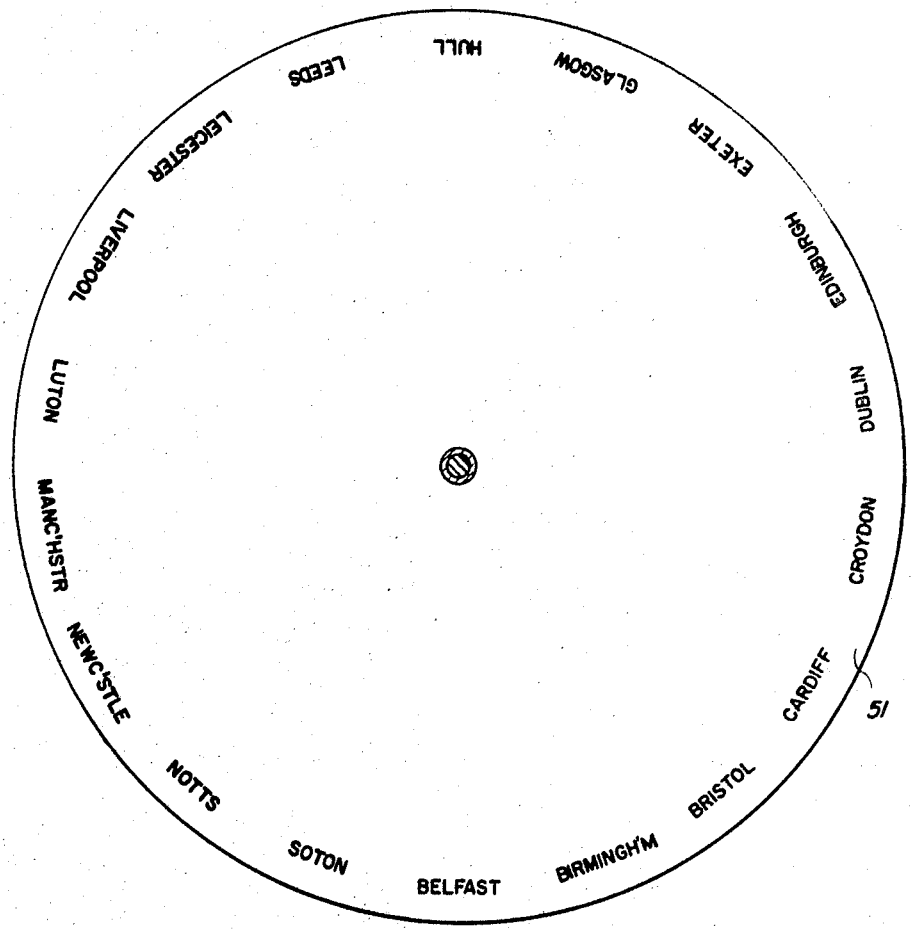
FIG. 7 is a bottom view of the disc of the device shown in FIG. 1.
Figure 6:
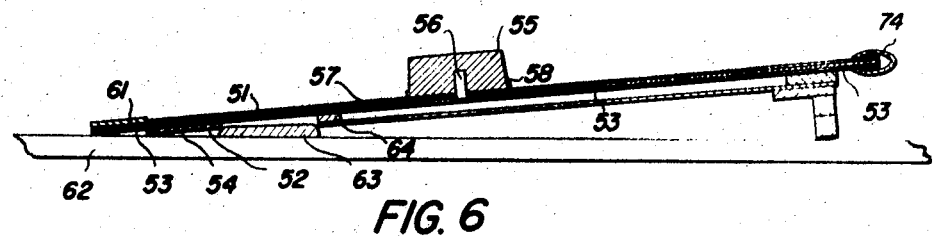
FIG. 6 is a sectional view of the device taken along line 6—6 of FIG. 5.

FIGURES 5 to 7 illustrate an alternative arrangement of an exposure device in which the alternative headings are arranged on a disc. A paper stop 52 is secured on the underside of a shielding member 53 for locating the document to be copied in conjunction with the selected heading. As aperture 54 is formed through the shielding member 53 and paper stop 52.

The disc with a central knob 55 is mounted for rotation about its axis on a stub shaft 56 in a recess 50 on the shielding member 53 and is covered by a transparent sheet 57 provided with a window 58 for the knob 55.

As shown in FIGURE 5, the alternative headings are marked on the underside of the disc 51 along equal tangents to a circle coaxial with the disc and near the circumference of the disc so that as the disc is rotated each heading in turn is aligned with the aperture 54. Replicas of the headings are marked on the upperside of the disc in the same relative positions as those on the underside of the disc. The transparent sheet 57 is marked with an arrow 59 indicating the heading which is at that time aligned with the aperture 54. A scale 61 for centering the documents to be copied with respect to the device is marked on the upperside of the device outside the circle of the indicated headings.

As can be seen in FIGURE 6, the disc is mounted at a slight angle to the copying window or platen of the copying machine (indicated at 62) so that the heading to be copied may be close to the window, while the disc may pass over the frame 63 of the window. The device is provided with a recess 64 to receive the frame 63 of the window to locate the device on the machine.

The device illustrated in FIGURES 5 to 7 is operated in a similar manner to that previously described, the headings in the present arrangement being selected by rotating the disc 51.

When a new set of headings are required, the disc 51 may be replaced by another by lifting the transparent sheet 57 from the device, removing the disc from the stub shaft 56 and substituting another disc. The transparent sheet 57 is secured in position by a clip strip 74 along the upper edge of the shielding member 53.

The device only reduces the maximum size of document which can be copied by the distance between the paper stop 52 and the frame 63 of the copying window when the device is in position.

In the arrangements described, each heading is located on the movable member 15 or 51 immediately below its replica on the upperside of the member. If the arrow 21 or 59 is not positioned above the aperture 19 or 54, each replica should be suitably separated from the corresponding heading.

While the invention has been described with reference to the structure disclosed herein, it is not confined to the details set forth, but is intended to cover such modifications or changes as may come within the scope of the following claims.

What is claimed is:

1. In a copying apparatus in which a device presents variable copyable information for cooperation with the platen of a copying machine having means for projecting the image of the information and the image of a document to be copied therewith, an improved display device including
    a frame,
    a planar movable opaque member arranged to be moved in said frame and supporting text information thereon to be presented to the platen, said frame being arranged with stop means for registering a selected portion of a document to be copied, said frame being formed with marking indicia adjacent said stop means to facilitate registering the document relative to the text information being copied, and
    means associated with the movable member from moving the same and the text information from a first to additional positions to present different portions of the member to the platen for projection along with the selected portion of the document by the copying machine.

2. A device as recited in claim 1 where the movable member is a slide mounted for linear movement within the frame.

3. A device as recited in claim 1 wherein the movable member is a disc mounted on the frame for movement relative thereto.

References Cited

UNITED STATES PATENTS

| | | | |
|---|---|---|---|
| 1,411,359 | 4/1922 | Jenkins | 95—1.1 XR |
| 1,826,664 | 10/1931 | Hopkins | 95—1.1 |
| 2,188,843 | 1/1940 | Pappajion | 95—1.1 |
| 3,267,843 | 8/1966 | Lemelson | 95—1.1 |

NORTON ANSHER, Primary Examiner

L. H. McCORMICK, JR., Assistant Examiner

U.S. Cl. X.R.

353—30